United States Patent

Morimoto

[15] 3,635,664
[45] Jan. 18, 1972

[54] REGENERATION OF HYDROCHLORIC ACID PICKLING WASTE BY $H_2SO_4$ ADDITION, DISTILLATION AND $FeSO_4$ PRECIPITATION

[72] Inventor: Yasuo Morimoto, Osaka, Japan

[73] Assignee: Daido Chemical Engineering Corporation, Osaka-shi, Japan

[22] Filed: May 6, 1970

[21] Appl. No.: 35,199

[30] Foreign Application Priority Data

Aug. 20, 1969 Japan..............................44/66243
Nov. 8, 1969 Japan..............................44/89523

[52] U.S. Cl.....................................23/126, 23/154, 23/305, 203/12, 203/35, 203/88, 203/96, 203/79, 203/100, 203/47
[51] Int. Cl.....................B01d 3/34, C01g 49/14, C01b 7/08
[58] Field of Search..........................203/35, 12, 88, 95–97, 203/47, 78, 79, 100; 23/154, 126, 305; 202/153–155, 174

[56] References Cited

UNITED STATES PATENTS

| | | | |
|---|---|---|---|
| 940,293 | 11/1909 | Wells | 23/154 |
| 2,437,290 | 3/1948 | Bottenberg et al. | 23/154 |
| 2,743,219 | 4/1956 | Riehm | 203/12 |
| 2,764,532 | 9/1956 | Rauh | 203/12 |
| 3,192,128 | 6/1965 | Brandnieur et al. | 203/96 |
| 3,399,964 | 9/1968 | Michels et al. | 23/154 |
| 3,440,009 | 4/1969 | Flood et al. | 23/154 |
| 3,540,513 | 11/1970 | Sumiya et al. | 23/126 |

*Primary Examiner*—Wilbur L. Bascomb, Jr.
*Attorney*—Larson, Taylor and Hinds

[57] ABSTRACT

In recovering hydrochloric acid from a spent hydrochloric acid pickle liquor the process is characterized by adding sulfuric acid to hydrochloric acid waste to convert $FeCl_2$ in said waste to HCl and $FeSO_4$ and to obtain a mixture containing at least 38 percent by weight of free sulfuric acid, distilling said resultant mixture to vaporize substantially all of the HCl therefrom together with water and to precipitate ferrous sulfate, condensing said HCl and water thus vaporized to recover hydrochloric acid, separating the precipitated ferrous sulfate from the residual liquid and circulating the resultant liquid free of ferrous sulfate as a sulfuric acid source.

4 Claims, 3 Drawing Figures

REGENERATION OF HYDROCHLORIC ACID PICKLING WASTE BY H₂SO₄ ADDITION, DISTILLATION AND FlSO₄ PRECIPITATION

The present invention relates to regeneration of a hydrochloric acid pickling waste, more particularly to a novel and useful method and apparatus for efficiently recovering hydrochloric acid from a hydrochloric acid pickling waste by distillation.

In recent years, hydrochloric acid has come to be used extensively in pickling various steel products in place of sulfuric acid. Although disposal of sulfuric acid is usually carried out by distillation, effective recovery of hydrochloric acid from a spent hydrochloric acid pickle liquor by distillation has not been proposed yet. This is attributable to the following reasons:

1. Very dilute hydrochloric acid alone is recovered by distillation and a considerable amount of HCl is left unrecovered in the liquor because of the low concentration of free HCl in the hydrochloric acid pickling waste and low order of volatility of HCl relative to water.

2. The fact that a considerable amount of chlorine component present therein in the form of $FeCl_2$ can not be recovered as hydrochloric acid results in the loss of the chlorine component.

For these reasons, conventionally employed is a method in which a hydrochloric acid pickling waste is sprayed into a roaster, whereby water and free HCl in the waste are driven off quickly, while $FeCl_2$ is hydrolyzed to produce iron oxide and hydrogen chloride. The HCl gas exhausted from the top of the roaster is absorbed into water to form hydrochloric acid of a suitable concentration.

However, the method described requires a large-scale roasting apparatus as well as complex operations, with an inevitable disadvantage that roasting at high temperatures produces marked corrosion in the apparatus.

An object of the present invention is to eliminate these drawbacks of conventional methods and to provide a method and apparatus for making it possible to recover hydrochloric acid efficiently from a hydrochloric acid pickling waste by distillation.

Another object of the present invention is to provide a method and apparatus for advantageously recovering as hydrochloric acid substantially all chlorine components from hydrochloric acid pickling waste.

Another object of the present invention is to provide a method and apparatus for recovering concentrated hydrochloric acid from a hydrochloric acid pickling waste, the method and apparatus therefore being capable of recovering concentrated hydrochloric acid even from an acid waste of a low concentration.

Another object of the present invention is to provide a method which is capable of treating a hydrochloric acid pickling waste in simple but continuous operation by employing an equipment which is relatively small in scale and an apparatus therefor.

Still another object of the present invention is to provide a method and apparatus capable of treating a hydrochloric acid pickling waste without requiring a high temperature essential to the roasting method but with an advantage that the corrosion of apparatus is minimized.

These and other objects of the present invention will become apparent from the following detailed description.

The present method for treating a hydrochloric acid pickling waste comprises steps of:

1. adding sulfuric acid to the hydrochloric acid pickling waste to convert $FeCl_2$ in the waste to HCl and $FeSO_4$ and to obtain a mixture containing at least 38 percent by weight of free $H_2SO_4$;

2. distilling the resultant mixture to vaporize substantially all of the HCl therefrom together with water and to precipitate the ferrous sulfate;

3. condensing the HCl and water thus vaporized to recover hydrochloric acid;

4. separating precipitated ferrous sulfate from the residual liquid; and 5. circulating the resultant liquid free of ferrous sulfate as a sulfuric acid source.

In accordance with the present invention, it is required to add sulfuric acid to the hydrochloric acid pickling waste in an amount necessary for converting $FeCl_2$ in the acid waste to HCl and $FeSO_4$ by double decomposition and for producing a mixture containing at least 38 weight percent of the free $H_2SO_4$. Thus the sulfuric acid must be added to the waste in an amount by far exceeding the amount which is required for the above-mentioned double decomposition. Through the double decomposition of $FeCl_2$ substantially all chlorine components in the waste can be recovered as hydrochloric acid, while the presence of at least 38 percent by weight of free $H_2SO_4$ in the mixture effects marked increase in volatility of HCl relative to water, thereby permitting hydrochloric acid to be recovered at a high concentration. In the case where the hydrochloric acid pickling waste containing no free sulfuric acid is heated to the boiling point, the concentration of HCl in the liquid phase is at a high level in contrast with a low concentration of HCl in the vapor phase, whereas increase in the concentration of free sulfuric acid due to the addition of excess sulfuric acid results in decrease in the concentration of HCl in the liquid phase while increasing the concentration of HCl in the vapor phase. When the concentration of free sulfuric acid reaches or exceeds 38 percent by weight, the concentration of HCl in the vapor becomes by far greater than that of HCl in the liquid. Accordingly, substantially all amount of chlorine components in the acid waste can be recovered as hydrochloric acid of a high concentration by distillation. The concentration of free sulfuric acid in the acid waste may preferably be in the range of 45 to 60 percent by weight. By the distillation the ferrous sulfate produced by double decomposition is precipitated as monohydrate crystals and separated from the liquid.

After the recovery of hydrochloric acid and the separation of ferrous sulfate monohydrate, the residual liquid is circulated for use as sulfuric acid source. The concentration of the recovered sulfuric acid to be circulated varies over a wide range, but usually, it is in the range of 45 to 65 weight percent. The recovered sulfuric acid, when circulated, is added to the acid waste in combination with fresh sulfuric acid which is newly supplied. Concentrated sulfuric acid having a concentration of 95 weight percent or more, preferably of 98 weight percent or more, may be used as the fresh sulfuric acid. The fresh sulfuric acid may usually be supplied in at least stoichiometric amount for converting $FeCl_2$ in the waste to $FeSO_4$ and HCl. Preferably it is supplied in an amount of 1 to 10 weight percent in excess of the stoichiometric amount.

Although various procedures may be employed in mixing sulfuric acid with the hydrochloric acid pickling waste, the most preferable is a method in which the hydrochloric acid pickling waste and fresh sulfuric acid are respectively added to the circulating sulfuric acid or another method in which fresh sulfuric acid is added to the hydrochloric acid pickling waste to effect the double decomposition reaction and the resultant mixture is then fed to the circulating stream of sulfuric acid.

In distilling a mixture of hydrochloric acid waste and sulfuric acid in accordance with the present invention, the processes described below are preferably applied. According to one of the preferable processes, the mixture is subjected to flash distillation under reduced pressure before it is introduced into a distillation apparatus so as to alleviate corrosion of the distillation apparatus by the mixed acid. Due to the presence of at least 38 percent by weight of free sulfuric acid in the mixture, a major portion of HCl in the mixture is vaporized by the flash distillation. The HCl and water vaporized are then condensed for recovery, while the resultant mixture containing the rest of the hydrochloric acid is fed into the distillation apparatus to recover the residual hydrochloric acid and to precipitate ferrous sulfate.

Also preferable for the distillation of hydrochloric acid is a process in which hydrochloric acid can be recovered at a concentration higher than the available concentration of hydrochloric acid in the acid waste to be treated. By "the available concentration of hydrochloric acid" herein used is meant the total concentration of free HCl contained in the acid waste and HCl to be produced upon double decomposition of ferrous chloride. According to this process, the mixture of hydrochloric acid pickling waste and sulfuric acid is subjected to steam distillation, whereby substantially all of HCl in the mixture is vaporized and condensed as hydrochloric acid for recovery. The residual liquid is concentrated to precipitate the ferrous sulfate formed, while water vapor generated is allowed to escape from the system. Accordingly to this process in which water is removed from the system is capable of recovering hydrochloric acid whose concentration is higher than the available concentration. Especially by refluxing a portion of the recovered hydrochloric acid into the top of the distillation tower, it is possible to recover concentrated hydrochloric acid in proportion to the reflux ratio of the acid. Normally, the reflux ratio of the acid may preferably be 1 to 3. This process is particularly effective in recovering highly concentrated hydrochloric acid from hydrochloric acid pickling wastes of low concentrations.

In order to more clearly describe the invention in its various embodiments and provide a better understanding thereof, reference is had to the accompanying drawings in which.

Figure 1:
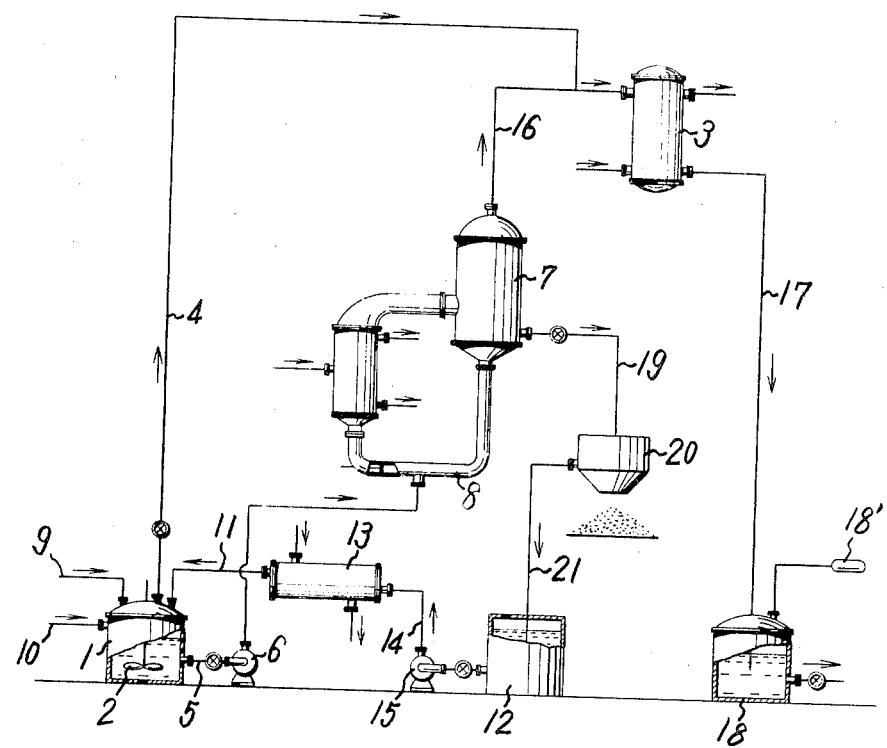
FIG. 1 is a schematic diagram showing a preferred embodiment of the apparatus of the invention.

The apparatuses shown in the drawings are made of a material capable of withstanding treating conditions such as impervious carbon, material lined with rubber lining, or the like. FIG. 1 shows an apparatus of flash distillation type. Designated at 1 is a flash chamber provided with an agitator 2. The top of the chamber 1 is connected by a line 4 to a condenser 3. The lower portion of the chamber 1 is connected, by a line 5 with an intermediate pump 6, to a liquid circulation pipe 8 of a distillation chamber 7 of external heating type. The chamber 1 is further provided with a line 9 for feeding an acid waste from an acid waste tank (not shown), a line 10 for supplying fresh sulfuric acid and a line 11 for conducting preheated circulated sulfuric acid. To preheat sulfuric acid to be circulated, a heater 13 is disposed between a tank 12 for sulfuric acid recovered and the chamber 1. The tank 12 is connected to the heater 13 by a line 14 with a pump 15 interposed therebetween. Extending from the top portion of the distillation chamber 7 is a line 16 which, along with the line 4 from the flash chamber 1, is connected to the condenser 3 whose lower portion is further connected by a line 17 to a tank 18 for hydrochloric acid recovered. The tank 18 is connected to a pressure reducing means such as vacuum pump 18' to maintain the system at reduced pressure level. The lower portion of the distillation chamber 7 is connected by a line 19 to a centrifugal separator 20 which is further connected by a line 21 to the tank 12 for sulfuric acid recovered.

In this apparatus waste hydrochloric acid to be treated is continuously fed into a flash tank 1 through a line 9 and at the same time fresh sulfuric acid and preheated sulfuric acid for circulation are continuously supplied into the chamber 1 through lines 10 and 11 respectively in a total amount sufficient to convert $FeCl_2$ in the waste to $FeSO_4$ and HCl and further to produce a mixture containing at least 38 weight percent of free sulfuric acid. The circulated sulfuric acid may be preheated to a temperature high enough to vaporize HCl and water from the resultant mixture under reduced pressures applied. Thus the double decomposition takes place instantaneously and the major portion of HCl in the mixture is vaporized with water. The vaporized HCl and water are introduced into the condenser 3 through the line 4. By means of pump 6, the liquid containing a minor portion of HCl is conducted through line 5 into the distillation chamber 7, where it is distilled. The rest of the HCl vaporized is then led through the line 16 into the condenser 3 together with the vaporized HCl from the flash chamber 1. After condensation, the recovered hydrochloric acid is sent into the tank 18. The liquid in the distillation chamber 7 containing ferrous sulfate monohydrate which is crystallized by concentration is fed into the centrifugal separator 20, where the crystals are separated. The resultant liquid, sulfuric acid free of HCl and $FeSO_4$, is then conducted into the tank 12 and sent to the flash chamber 1 for recirculation by means of pump 15 through a line 14, heater 13 and line 11.

When hydrochloric acid pickling waste is treated by this apparatus, substantially all of the chlorine components contained therein can be recovered approximately at the same concentration as the available concentration of the hydrochloric acid in the waste. This process is particularly advantageous in that the flash distillation serves to prevent corrosion of the distillation apparatus. Although the illustrated apparatus employs a system in which the sulfuric acid for circulation is fed into the flash chamber for flash distillation after being preheated by a heater, the sulfuric acid for circulation, fresh sulfuric acid and acid waste may of course be mixed together before preheating and the resultant mixture, thereafter preheated, may be sent into the flash chamber for flash distillation under reduced pressure.

Figure 2:
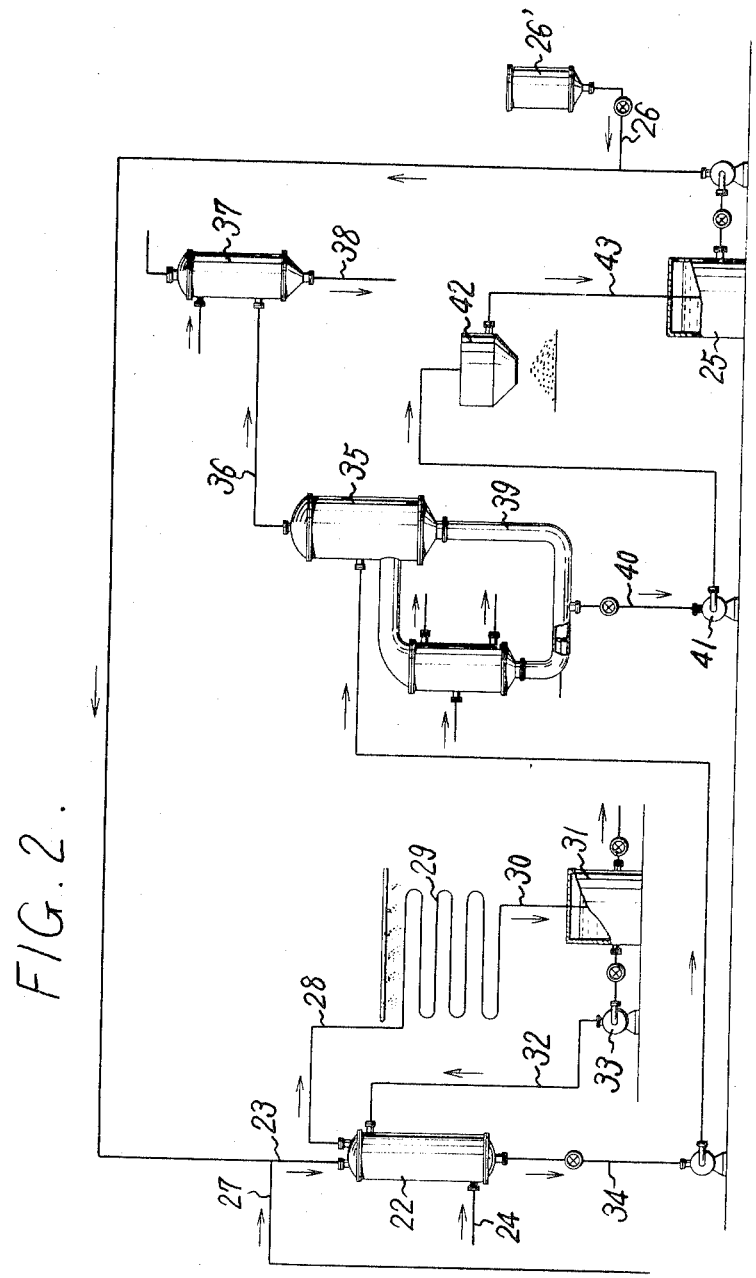
FIG. 2 is a schematic diagram showing another preferred embodiment of the apparatus of the invention.

FIG. 2 shows an apparatus for a process in which the hydrochloric acid waste is treated by steam distillation. Designated at 22 is a distillation tower filled with packings such as Raschig rings. The top of the tower 22 is provided with a line 23 for feeding a mixture of the hydrochloric acid pickling waste and sulfuric acid. Extending from the lower portion of the tower 22 is a line 24 for supplying steam. The line 23 is connected to a tank 25 for sulfuric acid to be circulated and, at intermediate portions, to a line 26 for supplying fresh sulfuric acid from a tank 26' and to a line 27 for supplying hydrochloric acid waste. By means of a line 28 the top of the distillation tower 22 is connected to a condenser 29, which is further connected to a tank 31 for recovered hydrochloric acid by a line 30. Communicating the bottom of the tank 31 with the upper portion of the distillation tower 22 by way of a pump 33 is a line 32 for refluxing the recovered hydrochloric acid into the distillation tower 22. The bottom of the distillation tower 22 is connected by a line 34 to a evaporator 35 of external heating type, the top of which is further connected to a condenser 37 by a line 36. Though not shown, the condenser 37 is connected to pressure reducing means such as a vacuum pump and the bottom of the condenser 37 is provided with a drain pipe 38. The liquid circulation pipe 39 of the evaporator 35 is connected, by a line 40 provided with a pump 41, to a centrifugal separator 42 which is further connected to the tank 25 by a line 43.

In this apparatus, a mixture of a hydrochloric acid pickling waste and sulfuric acid in which $FeCl_2$ is converted into $FeSO_4$ and HCl and which contains at least 38 weight percent of free sulfuric acid by the addition of sulfuric acid for circulation and fresh sulfuric acid is fed to the top of the distillation tower 22 through the line 23 to be brought into countercurrent contact with superheated steam introduced through the line 24 into the lower portion of the tower and moving upward as the mixture flows downward in the tower. As a result, substantially all HCl and a portion of water in the acid waste are vaporized. The HCl and water thus vaporized are condensed in the condenser 29 and conducted into the tank 31. The liquid free of hydrochloric acid in the bottom of the tower 22 is led through the line 34 into the evaporator 35 of external heating type, where it is concentrated to precipitate ferrous sulfate crystals. The crystals are then separated by the centrifugal separator 42 and the residual liquid is thereafter sent into the tank 25 for circulation. On the other hand, the steam from the evaporator 35 is condensed by the condenser 37 and drained through the pipe 38. Since water is removed from the system in this manner, this apparatus makes it possible to recover hydrochloric acid whose concentration is higher than the available concentration of hydrochloric acid in the pickling acid waste. In the case where a part of the recovered hydrochloric acid is refluxed to the distillation tower 22 through the line 32, highly concentrated hydrochloric acid can be recovered in accordance with the reflux ratio of the hydrochloric acid.

Figure 3:
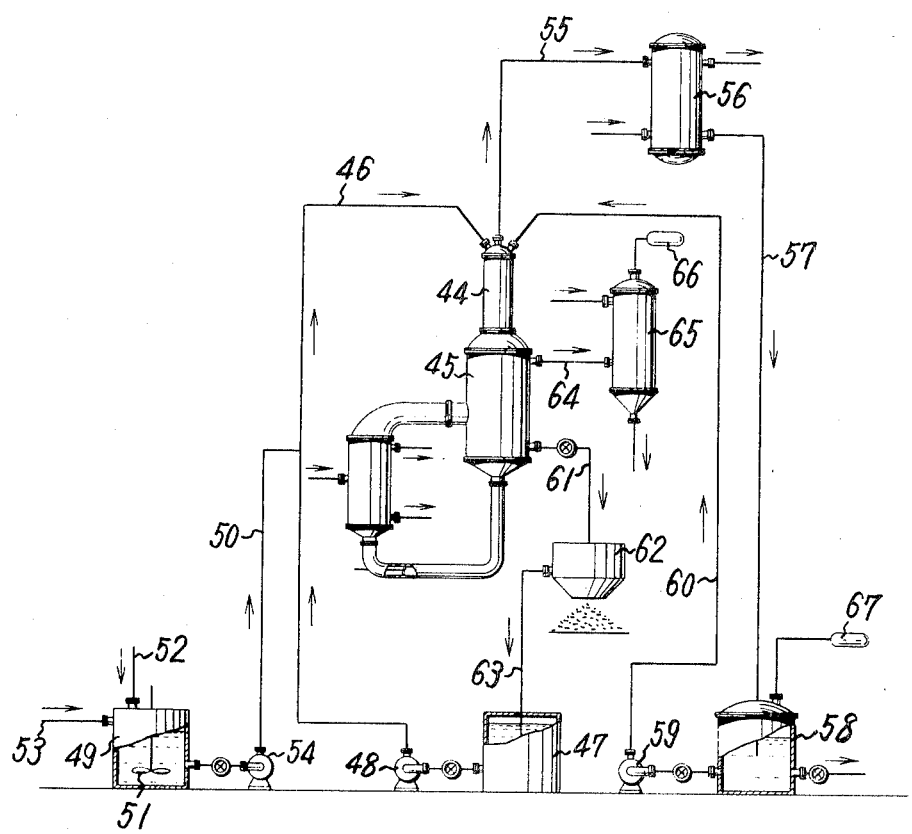
FIG. 3 is a schematic diagram showing another embodiment of the apparatus of the invention.

The apparatus shown in FIG. 3 is a compact embodiment of the apparatus illustrated in FIG. 2. This apparatus is provided with a distillation tower 44 which is disposed on the top of, and communicated with, an evaporator 45 of external heating type, the structure being such that distillation is effected with the steam from the evaporator 45. Extending from the top of the distillation tower 44 is a line 46 for feeding the mixture of a hydrochloric acid pickling waste and sulfuric acid. The line 46 is connected, through a pump 48, to a tank 47 for sulfuric acid to be circulated. A line 50 from a reactor 49 is joined to the line 46 at an intermediate portion thereof. The reactor 49 is provided with an agitator 51 and serves to subject the hydrochloric acid pickling waste from a line 52 to double decomposition reaction with fresh sulfuric acid from a line 53 prior to distillation so as to convert $FeCl_2$ in the acid waste to $FeSO_4$ and HCl. Designated at 54 is a pump. By means of a line 55, the top of the distillation tower 44 is connected to a condenser 56, which is further connected by a line 57 to a tank 58 for the recovered hydrochloric acid. The tank 58 is further connected, by a line 60 provided with a pump 59, to the top of the distillation tower 44, so that a portion of the recovered hydrochloric acid can be refluxed to the distillation tower when desired. The lower portion of the evaporator 45 is connected by a line 61 to a centrifugal separator 62, which is then connected by a line 63 to a tank 47 for sulfuric acid to be circulated. At a side portion, the evaporator 45 is connected by a line 64 to a condenser 65, which is connected to a vacuum pump 66. The tank 58 is also connected to a vacuum pump 67.

In this apparatus, the vapor from the evaporator 45 is utilized for the distillation of mixture of the hydrochloric acid waste and sulfuric acid. Part of the vapor is taken out of the system through the line 64 to recover hydrochloric acid of a high concentration.

For better understanding of the invention, examples are given below, in which all percentages are by weight.

EXAMPLE 1

In this example, an apparatus as shown in FIG. 1 was employed. A hydrochloric acid pickling waste containing 6 percent by weight of HCl and 17 percent by weight of $FeCl_2$ was continuously fed, at the rate of 1 t/hr., through the line 9 to the flash chamber 1 the interior of which had a reduced pressure of 700 mm. Ag The acid waste fed to the chamber 1 was agitated and mixed with 50 weight percent circulating sulfuric acid introduced through the line 11 into the chamber 1 at the rate of 5.5 t/hr. after being heated to 120° C. in the heater 13 and with fresh sulfuric acid supplied into the chamber 1 through the line 10 at the rate of 150 kg./hr., the circulating sulfuric acid was recovered at the rate of 5.5 t/hr., the fresh sulfuric acid having a concentration of 98 percent by weight. Thus, $FeCl_2$ in the acid waste was converted to $FeSO_4$ and HCl and a vapor containing 25 percent by weight of HCl was produced approximately at the rate of 440 kg./hr. The residual liquid which contained only about 1.21 percent by weight of HCl unrecovered was further subjected to vacuum distillation in the distillation chamber 7 to vaporize the remaining HCl, whereby a vapor containing 10.8 percent by weight of HCl was produced at the rate of 452 kg./hr. The vapor generated was condensed in the condenser 3 together with the vapor from the flash chamber 1 to recover hydrochloric acid containing about 17.7 percent by weight of HCl at the rate of 892 kg./hr. Crystals of $FeSO_4 \cdot H_2O$ were separated from the residual liquid by the centrifugal separator 20 to recover sulfuric acid at the rate of 5.5 t/hr. The amount of HCl attached to $FeSO_4 \cdot H_2O$ was found to be only 0.02 percent by weight.

EXAMPLE 2

In this example, an apparatus as shown in FIG. 2 was employed. A hydrochloric acid pickling waste containing 5 percent by weight of HCl and 20 percent by weight of $FeCl_2$ was continuously fed through the line 27 into the line 23. Flowing through the line 23 were 98 weight percent fresh sulfuric acid flowing at the rate of 160 kg./hr. and another stream of sulfuric acid flowing at the rate of 3.04 t/hr. and recovered at the same rate through the evaporator 35 and centrifugal separator 42, the latter having a concentration of 60 percent by weight and a temperature of 80° C. When brought into contact with the sulfuric acid, the acid waste was subjected to double decomposition, whereby $FeCl_2$ was converted to $FeSO_4$ and HCl. The resultant liquid was supplied downward into the distillation tower 22 at its top, while at the lower end saturated steam of three atm. was introduced upwardly into the tower at the rate of 640 kg./hr. Thus, the liquid flowed downward was brought into countercurrent contact with the steam to vaporize substantially all amount of HCl in the liquid through the top of tower. The HCl and water vaporized were then condensed in the condenser 29, with the result that hydrochloric acid having a concentration of 30 percent by weight was recovered in the tank 31 at the rate of 550 kg./hr. Discharged from the bottom of the tower 22 at the rate of 3.65 t/hr. was a liquid containing 50 percent by weight of $H_2SO_4$ and $FeSO_4$ but substantially free of HCl, which was then fed into the evaporator 35 where the liquid was condensed under a reduced pressure of 705 mm. Hg by heating with saturated steam of three atm. supplied to the external heater of the evaporator at the rate of 410 kg./hr. As a result, 340 kg./hr. of water was vaporized and drained off through the line 38 after being condensed in a condenser 37. The crystals of $FeSO_4 \cdot H_2O$ thus precipitated at the rate of 60 kg./hr. were separated by the centrifugal separator 42. Sulfuric acid having a construction of 60 percent and a temperature of 80° C. was obtained.

EXAMPLE 3

In this example, an apparatus as shown in FIG. 3 was employed. A hydrochloric acid pickling waste containing 3.8 percent by weight of HCl and 16.7 percent by weight of $FeCl_2$ was fed to the reactor 49 at the rate of 1 t/hr. Ninety-eight percent by weight of fresh sulfuric acid was added to the acid waste at the rate of 165 kg./hr. and mixed therewith to subject $FeCl_2$ in the acid waste to double decomposition. The liquid was then led through the line 50 into the line 46 for mixture with recovered sulfuric acid of a concentration of 60 percent by weight flowing through the line at the rate of 4.4 t/hr. The resultant liquid was supplied downward into the distillation tower 44 and heated for distillation with steam of two atm. supplied to the external heater of the evaporator 45 at the rate of 1.5 t/hr. The interior of the evaporator 45 was maintained at the pressure of 710 mm. Hg by the vacuum pump 67 and at the pressure of 700 mm. Hg by the vacuum pump 66. The temperature was kept at 50° C. at the top of tower 44 and at 75° C. at the bottom thereof. The amount of cooling water for the condenser 65 was controlled to permit water vapor to flow out of the evaporator into the condenser 65 at the rate of 150 kg./hr., while the liquid in the evaporator was maintained at a constant level by controlling the amount of cooling water in the condenser 56. In this manner, HCl of a concentration of 18 percent by weight was vaporized from the top of tower 44 at the rate of 1.1 t/hr. A portion of this HCl was recovered at the rate of 735 kg./hr., the remainder being refluxed. On the other hand, crystals of $FeSO_4 \cdot H_2O$ precipitated in the evaporator were separated by the centrifugal separator 62 at the rate of 300 kg./hr.

I claim:
1. A method for recovering hydrochloric acid from a hydrochloric acid pickling waste by distillation comprising the steps of:
   1. adding sulfuric acid to hydrochloric acid waste to convert $FeCl_2$ in said waste to HCl and $FeSO_4$ and to obtain a mixture containing at least 38 percent by weight of free sulfuric acid;

2. distilling said resultant mixture to vaporize substantially all amount of the HCl therefrom together with water and to precipitate ferrous sulfate;
3. condensing said HCl and water thus vaporized to recover hydrochloric acid;
4. separating the precipitated ferrous sulfate from the residual liquid; and
5. circulating the resultant liquid free of ferrous sulfate as a sulfuric acid source.

2. The method as claimed in claim 1 wherein said mixture of waste hydrochloric acid and sulfuric acid is first subjected to flash distillation under reduced pressure to vaporize a major portion of HCl from the acid waste and the residual liquid thereby obtained is further distilled to vaporize the rest of HCl and to precipitate ferrous sulfate.

3. The method as claimed in claim 1 wherein said mixture of hydrochloric acid waste and sulfuric acid is subjected to steam distillation to vaporize substantially all of the HCl from said hydrochloric acid waste and the residual liquid thereby obtained is concentrated to remove a part of water from the system and to precipitate ferrous sulfate.

4. The method as claimed in claim 3 wherein said steam distillation is carried out by utilizing a part of the water vapor produced by the concentration of said residual liquid.

* * * * *